(12) United States Patent
Salah

(10) Patent No.: US 8,517,474 B2
(45) Date of Patent: Aug. 27, 2013

(54) NON-ROTATING WHEEL CAP

(76) Inventor: Mazen Yousef Falah Salah, Amman (JO)

(*) Notice: Subject to any disclaimer, the term of this patent is extended or adjusted under 35 U.S.C. 154(b) by 0 days.

(21) Appl. No.: 13/164,013

(22) Filed: Jun. 20, 2011

(65) Prior Publication Data
US 2012/0319459 A1 Dec. 20, 2012

(51) Int. Cl.
*B60B 7/20* (2006.01)
(52) U.S. Cl.
USPC .................................................. 301/37.25
(58) Field of Classification Search
USPC ............. 301/37.25, 37.101, 37.26, 37.28, 301/37.102, 37.31, 108.1–108.3
See application file for complete search history.

(56) References Cited

U.S. PATENT DOCUMENTS

| | | | |
|---|---|---|---|
| 6,848,751 B1* | 2/2005 | Yuan | 301/37.25 |
| 6,857,709 B1* | 2/2005 | McLean et al. | 301/37.25 |
| 2002/0125761 A1* | 9/2002 | Matushita | 301/37.25 |
| 2009/0058177 A1* | 3/2009 | Berens | 301/37.25 |
| 2011/0260524 A1* | 10/2011 | Yin | 301/37.25 |

* cited by examiner

*Primary Examiner* — Jason Bellinger
(74) *Attorney, Agent, or Firm* — Altera Law Group, LLC

(57) ABSTRACT

The present invention relates to a non-rotating wheel cap device which is inserted at the center of a wheel rim using fixtures; wherein such cap is used to display printed or adhered decorations; and wherein such decorations remain stationary in an upright position, while the rim is rotating. The preferred embodiment of the present invention comprises a non-rotating wheel cap device comprising a cylindrical body having a shaft, a roller bearing adapted to receive the shaft in a press-fit configuration, a curved body and a disk-shaped cover.

6 Claims, 2 Drawing Sheets

NON-ROTATING WHEEL CAP

FIELD OF THE INVENTION

The present invention relates to a non-rotating decorative cap which can be fixed to a rotating body, and in particular, the present invention relates to a non-rotating decorative cap which can be fixed at the center of a vertically rotating member such as a vehicle's wheel; thereby showing a non-rotating state of a pattern, emblem or advertisement irrespective to the rotation of a rotating member.

BACKGROUND OF THE INVENTION

Non-Rotating decorative caps are widely known as vehicles' accessories, which are used to display logos, emblems, or advertisements upon; wherein such caps use adhesives in order to be installed, and use transparent protective covers on the displayed item; wherein the transparent cover causes dust to be accumulated between the transparent cover and the displayed item; and wherein such caps vibrate at certain speeds causing the displayed item to vibrate, and thus become unreadable.

To overcome the rotation problem of regular decorative wheel caps which causes the logo, emblem, advertising or pattern of the caps to be unreadable during the motion of the vehicle, a new non-rotating wheel cap must be put in place with an engineered shape that prevents the caps from vibrating. The new cap must be light in weight, easier to install and more stable than those in the prior art, and does not use any protective covers to prevent the accumulation of dust in order for the logo to be readable all the time.

SUMMARY OF THE INVENTION

Through the movement of a vehicle and during the rotation of the vehicle wheels, any decoration; whether it was a logo, an advertisement or an emblem imprinted on a regular wheel cap becomes impossible to be seen and identified clearly, and after the vehicle stops in a static position, the decoration rarely remains in its upright position and usually stops in a tilted manner, therefore, the main purpose of such cap is to exhibit certain decorative shapes clearly.

Having discussed the main flaw in a regular wheel cap, the need for a non-rotating wheel cap that overcomes this flaw becomes apparent, but due to the limitations of acceptable prices paid for wheel caps and due to constructive and design-related issues, the mechanism that keeps the decoration in its upright vertical position in such caps must be cost effective, simple in design, small in size, light in weight and easy to clean, therefore it is a main objective of the present invention to provide a non-rotating wheel cap that is distinguished by these advantageous features.

To achieve the objective of the present invention, all the components of the non-rotating wheel cap disclosed in this invention are press-fitted to each other in order to avoid the usage of bolts and nuts; which would increase the weight of such cap, and accordingly increases the force needed to maintain such cap in its upright position. Such cap is installed in its position at the center of a wheel rim using fixtures, thus, it is easy for the user himself to install and uninstall such cap, whenever he pleases. Narrow spaces are avoided in the cap of the present invention, since these spaces increase the difficulty of cleaning such cap. The decorations displayed on such cap are at the most apparent component on the outer side of such cap, with no transparent surfaces covering the decoration, since these surfaces are known for accumulating mist.

There is provided a non-rotating wheel cap device for displaying decorations at the center of a vehicle's wheel rim, the device comprising:

a cylindrical body 1 having a central axis 15, a lower body edge 16 and an upper body edge 17, the cylindrical body 1 comprising an opening 18 at the upper body edge 17, a bottom wall 19 at the lower body edge 16, and inner body space between said bottom wall 19 and said opening 18, a shaft 3 extending vertically from the bottom wall 19 along the central axis 15 outwardly toward the opening 18, a lip 20 extending from the upper body edge 17 radially outwardly from the central axis 15 and having an upper lip portion 21 and a lower lip portion 22, and mounting members 2 located at said lower lip portion 22 adapted to removably mount said cylindrical body 1 on said vehicle's wheel rim;

a roller bearing 6, said shaft 3 being adapted to be press-fitted inside said roller bearing 6;

a curved body 4 having substantially the shape of a semi circle 4 cut along a secant line with three extruded curved tips 30, 31, and 32 having substantially the shape of a wave along said secant line; the three tips including two identical side tips 30 and 32 respectively on each extremity of said secant line and a middle tip 31 substantially centered along said secant line with respect to the side tips, the middle tip 31 being larger in length along said secant line than the side tips 30 and 32, the curved body 4 comprising an upper and a lower lateral surfaces 26 and 27 having cylindrical holes 7 at said upper lateral surface 26, and a slot 5 located within said middle tip 31 and extending throughout the upper and lower lateral surfaces 26 and 27 of the curved body 4 for receiving the roller bearing 3; and a disk-shaped cover 9 having an upper and a lower cover surface 28 and 29, the disk-shaped cover 9 comprising cylindrical members 8 extending vertically downwardly from the lower cover surface 28, said cylindrical members 8 being adapted to be press-fitted inside said cylindrical holes 7 at the upper lateral surface 26 of the curved body 4.

Preferably, the cylindrical body 1 and the disk-shaped cover 9 are made out of plastic, and the curved body 4 is made out of metal. Preferably, the cylindrical holes 7 are three holes. Preferably, the disk-shaped cover 9 is adapted to cover the opening 18 of the cylindrical body 1. Preferably, the roller bearing 6 and the curved body 4 are adapted to be enclosed inside the inner body space between the opening 1 and the bottom wall 19.

BRIEF DESCRIPTION OF THE DRAWINGS

Further features and advantages of the present invention will become apparent from the following detailed description, taken in combination with the appended drawings, in which.

DETAILED DESCRIPTION OF THE INVENTION

Figure 1:
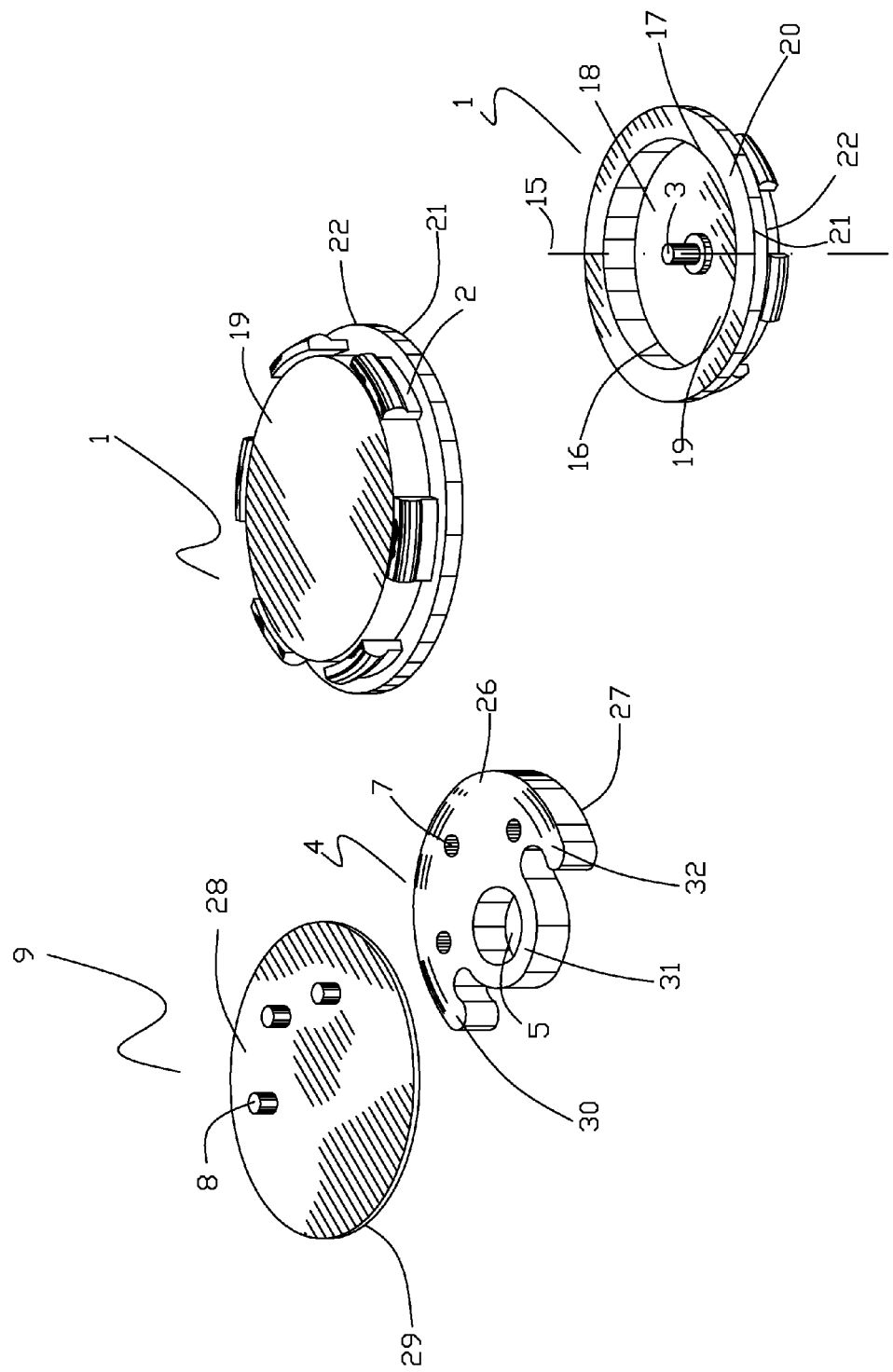
FIG. 1 illustrates a non-rotating wheel cap configured according to the preferred embodiment of the present invention; wherein the components of such cap are shown separately.
Figure 2:
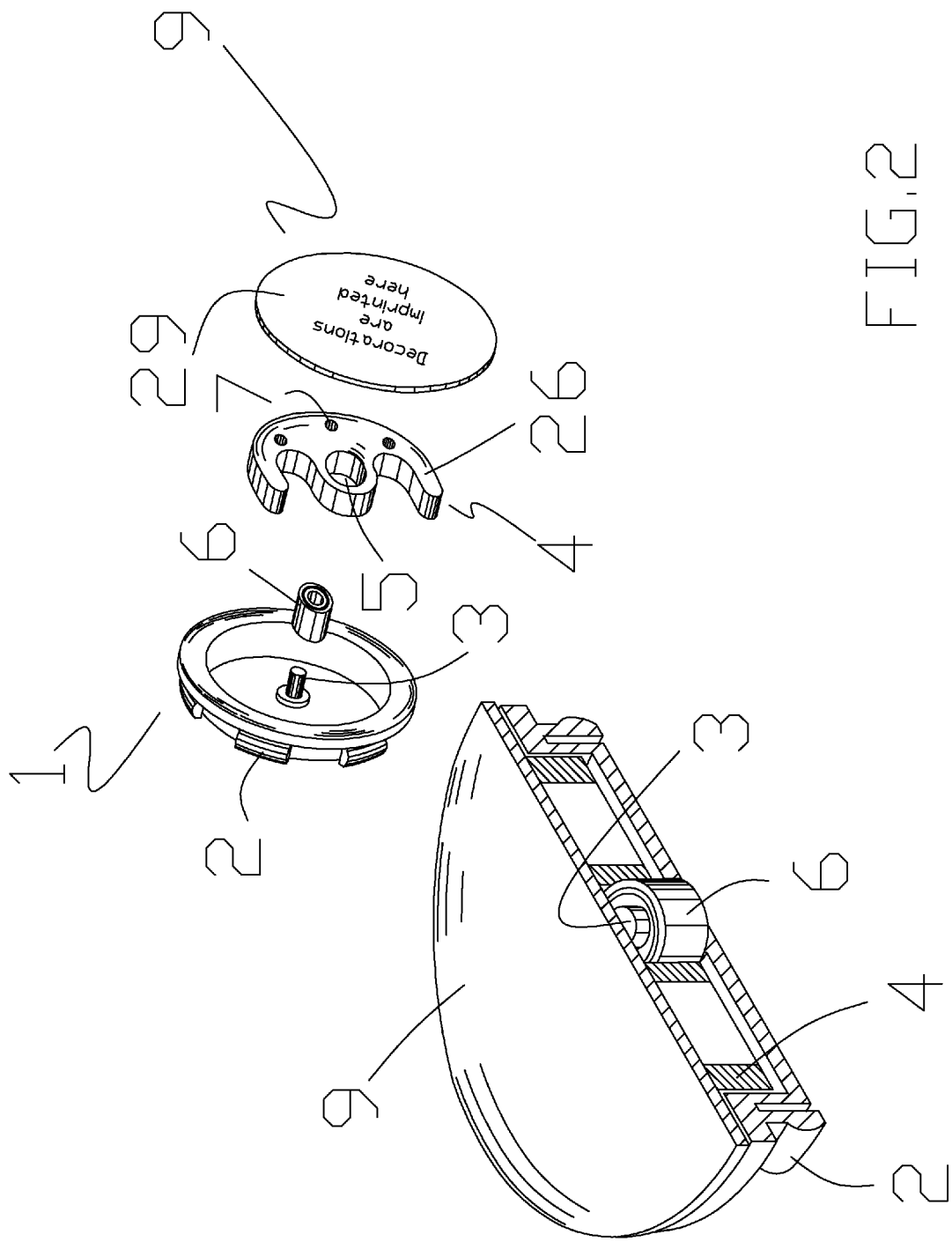
FIG. 2 illustrates an exploded view of a non-rotating wheel cap configured according to the preferred embodiment of the present invention.

FIG. 1 illustrates a non-rotating wheel cap for displaying decorations configured according to a preferred embodiment of the present invention; wherein this embodiment comprises a cylindrical body 1 having a central axis 15, a lower body edge 16 and an upper body edge 17, the cylindrical body 1 comprising an opening 18 at the upper body edge 17, a bottom wall 19 at the lower body edge 16, and inner body space between said bottom wall 19 and said opening 18, a shaft 3 extending vertically from the bottom wall 19 along the central axis 15 outwardly toward the opening 18, a lip 20 extending from the upper body edge 17 radially outwardly from the central axis 15 and having an upper lip portion 21 and a lower lip portion 22, and mounting members 2 located at said lower lip portion 22 adapted to removably mount said cylindrical body 1 on said vehicle's wheel rim; a roller bearing 6, said shaft 3 being adapted to be press-fitted inside said roller bearing 6; a curved body 4 having substantially the shape of a semi circle 4 cut along a secant line with three extruded curved tips 30, 31, and 32 having substantially the shape of a wave along said secant line; the three tips 30, 31 and 32 including two identical side tips 30 and 32 respectively on each extremity of said secant line and a middle tip 31 substantially centered along said secant line with respect to the side tips, the middle tip 31 being larger in length along said secant line than the side tips and having an upper and a lower lateral surfaces 26 and 27, the curved body 4 having cylindrical holes 7 at said upper lateral surface 26, and a slot 5 located within said middle tip 31 and extending throughout the upper and lower lateral surfaces 26 and 27 of the curved body 4 for receiving the roller bearing 3; a disk-shaped cover 9 having an upper and a lower cover surface 28 and 29, the disk-shaped cover 9 comprising cylindrical members 8 extending vertically downwardly from the lower cover surface 28, said cylindrical members 8 being adapted to be press-fitted inside said cylindrical holes 7 at the upper lateral surface 26 of the curved body 4.

Preferably, the cylindrical body 1 and the disk-shaped cover 9 are made out of plastic, and the curved body 4 is made out of metal. Preferably, the cylindrical holes 7 are three holes. Preferably, the disk-shaped cover 9 is adapted to cover the opening 18 of the cylindrical body 1. Preferably, the roller bearing 6 and the curved body 4 are adapted to be enclosed inside the inner body space between the opening 1 and the bottom wall 19.

From the discussed features of the preferred embodiment of the present invention, it is clearly noticed that the cylindrical body 1 can be manufactured based on the central space of a wheel rim, thus, and due to the compact design of the non-rotating wheel cap disclosed in present invention and since these designs enfold the mechanisms needed to keep the upright position of the cap inside the inner space of the cylindrical body 1, the cap can be simply inserted in the inner space of any wheel rim with no need to any modifications, in a manner similar to any regular wheel cap.

Excluding the roller bearing 6 and the curved body 4; which are made out of metal, all the components of the cap are made of plastic, in order to reduce weight; wherein such reduction in weight enables the single roller bearing 6 to efficiently hold the cap in its upright position.

The non-rotating wheel cap of the present invention has also been tested at a machine that rotates the wheel of a vehicle in order to simulate the actual motion of vehicles. Going at a simulated speed that exceeds 400 km/hr, the non-rotating wheel cap disclosed in the present invention kept at an upright position during the whole period of the test.

Although the above description of the present invention has disclosed the features of the invention as applied to the preferred embodiment; additions, omissions and modifications applied to the details of the embodiment illustrated may be made by those skilled in the art without departing from the essential characteristic of the present invention.

The invention claimed is:

1. A non-rotating wheel cap device for displaying decorations at the center of a vehicle's wheel rim, the device comprising:
   a cylindrical body having a central axis, a lower body edge and an upper body edge, the cylindrical body comprising an opening at the upper body edge, a bottom wall at the lower body edge, and inner body space between said bottom wall and said opening, a shaft extending vertically from the bottom wall along the central axis outwardly toward the opening, a lip extending from the upper body edge radially outwardly from the central axis and having an upper lip portion and a lower lip portion, and mounting members located at said lower lip portion adapted to removably mount said cylindrical body on said vehicle's wheel rim;
   a roller bearing, said shaft being adapted to be press-fitted inside said roller bearing;
   a curved body having substantially the shape of a semi-circle cut along a secant line with three extruded curved tips having substantially the shape of a wave along said secant line; the three tips including two identical side tips respectively on each extremity of said secant line and a middle tip substantially centered along said secant line with respect to the side tips, the middle tip being larger in length along said secant line than the side tips, the curved body comprising an upper and a lower lateral surfaces having cylindrical holes at said upper lateral surface, and a slot located within said middle tip and extending throughout the upper and lower lateral surfaces of the curved body for receiving the roller bearing; and
   a disk-shaped cover having an upper and a lower cover surface, the disk-shaped cover comprising cylindrical members extending vertically downwardly from the lower cover surface, said cylindrical members being adapted to be press-fitted inside said cylindrical holes at the upper lateral surface of the curved body.

2. The non-rotating wheel cap device as claimed in claim 1; wherein the cylindrical body and the disk-shaped cover are made out of plastic.

3. The non-rotating wheel cap as claimed in claim 1; wherein the curved body is made out of metal.

4. The non-rotating wheel cap device as claimed in claim 1; wherein the cylindrical holes are three holes.

5. The non-rotating wheel cap as claimed in claim 1; wherein the disk-shaped cover is adapted to cover the opening of the cylindrical body.

6. The non-rotating wheel cap as claimed in claim 1; wherein the roller bearing and the curved body are adapted to be enclosed inside the inner body space.

* * * * *